United States Patent [19]
Kakiuchi et al.

[11] Patent Number: 5,034,680
[45] Date of Patent: Jul. 23, 1991

[54] DIGITAL LEVEL DISPLAY DEVICE

[75] Inventors: Shizuo Kakiuchi; Hiroshi Iizuka, both of Saitama, Japan

[73] Assignee: Pioneer Electronic Corporation, Tokyo, Japan

[21] Appl. No.: 87,079

[22] Filed: Aug. 19, 1987

[30] Foreign Application Priority Data

Aug. 19, 1986 [JP] Japan .................. 61-195057

[51] Int. Cl.$^5$ ............................................. G01R 11/16
[52] U.S. Cl. .................................................. 324/103 P
[58] Field of Search ................ 307/351, 492; 324/132, 324/103 P; 364/481, 857, 722; 328/145; 381/56

[56] References Cited

U.S. PATENT DOCUMENTS

| | | | |
|---|---|---|---|
| 3,626,092 | 12/1971 | Wilson | 328/145 |
| 3,626,166 | 12/1971 | Berg et al. | 328/145 |
| 3,924,078 | 12/1975 | Bussey | 324/103 P |
| 4,011,509 | 3/1977 | Edwards | 328/145 |
| 4,109,198 | 8/1978 | Ueno | 324/103 P |
| 4,113,997 | 9/1978 | Horna | 364/722 |
| 4,300,203 | 11/1981 | Brown | 364/857 |
| 4,686,459 | 8/1987 | Begas | 324/132 |
| 4,692,693 | 9/1987 | Rabeyrolleo | 324/132 |
| 4,706,289 | 11/1987 | Jensen | 324/103 P |

Primary Examiner—Kenneth A. Wieder
Assistant Examiner—William J. Burns
Attorney, Agent, or Firm—Sughrue, Mion, Zinn Macpeak & Seas

[57] ABSTRACT

A digital level display device wherein the digital input signal is converted into an absolute value and further converted into its logarithm. The peak of the logarithm is detected and latched. A CPU reads the latched peak and converts into it into a signal for display.

5 Claims, 1 Drawing Sheet

DIGITAL LEVEL DISPLAY DEVICE

BACKGROUND OF THE INVENTION

1. Field of the Invention

The present invention generally relates to a digital level display device. It particularly relates to a digital level display device effectively used in a compact disk (CD) player, a digital audio tape recorder (DAT), or the like.

2. Background of the Invention

In a PCM recording/reproducing apparatus such as a CD player, a DAT, or the like, an analog audio signal is digitized so as to be recorded on a recording medium. During reproducing, on the other hand, a reproduced digital signal is converted into an analog signal which is sent out as an output. FIG. 2 is a block diagram showing an example of the conventional digital level display device used, for example, for monitoring a level of a digital signal in such a PCM recording/reproducing apparatus as described above.

In the drawing, a conversion circuit 1 converts a signal applied thereto into an absolute value signal representing an absolute value of the digital signal. The absolute value signal produced from the conversion circuit 1 is applied to a peak latch circuit 2 constituted by a register 3 and a comparator 4 so that a peak value of the absolute value signal is detected and latched. A CPU 5 reads the latched value of the peak latch circuit 2 at a predetermined timing, logarithmically converts the readout latched value into a value for indication in decibels (dB), and further converts the logarithmically converted value into a display signal suitable to be displayed. The CPU 5 applies the display signal to a display 8 constituted by a plurality of lamps, a plurality of light emitting diodes (LEDs), or the like, so as to cause the display 8 to display the peak level of the digital signal.

A reset switching device 6 is arranged so that if the reset switching device 6 is turned on, the CPU 5 controls the register 3 so as to clear the peak value latched in the register 3. A selector 7 is arranged so that if the selector 7 is operated, routines having different resolutions in a program of the CPU 5 are changed over from one to another so that the display resolution in the display 8 can be changed, for example, from a resolution of 3 dB to another resolution of 1 dB, or the like.

The CPU 5 is arranged to operate and process a signal on the basis of the program. Therefore, it takes a long time for the CPU 5 to perform a conversion operation in comparison with a period of sampling data. Accordingly, the CPU 5 causes the peak latch circuit 2 to latch the data for a time required for the operation and causes the peak latch circuit 2 to clear the latched value when the CPU 5 has read the data.

Thus, in the conventional digital level display device, the logarithmic conversion as well as the conversion into the display signal are performed by the CPU 5. Therefore, it is necessary to transfer all the bits representing an absolute value of data to the CPU 5. Therefore, there has been such a disadvantage that not only is a load of the CPU 5 made large but also the number of data lines is increased when data is transferred in parallel to the CPU 5 or the transfer time is increased when data is serially transferred to the CPU 5. Further, there has been a further disadvantage that the arrangement of the peak latch circuit becomes complicated.

SUMMARY OF THE INVENTION

It is therefore an object of the present invention to eliminate the foregoing disadvantages in the prior art.

It is another object of the present invention to provide a digital level display device with which the loading of a CPU can be made small, the number of data transfer lines to the CPU can be reduced, and a data transfer time can be shortened.

To attain the above objects, according to the present invention, the digital level display device comprises a conversion circuit for converting an input digital signal into an absolute value signal representing an absolute value of the digital signal, a decoder for logarithmically converting the absolute value signal into an output signal of fewer bits smaller than that of the absolute value signal, a peak latch circuit for detecting and latching a peak of the output signal of the decoder, a CPU for reading a signal of the peak latched by the peak latch circuit at a predetermined timing and for converting the read signal of the latched peak into a displaying signal, and a display responsive to the displaying signal from the CPU for displaying a level of the digital signal.

Thus, the absolute value signal representing the absolute value of the input digital signal is logarithmically converted by the decoder, and the thus converted signal is produced as an output signal of bits smaller in number than that of the absolute value signal. A peak of the output signal from the decoder is latched by the peak latch circuit and the latched peak is converted into a display signal by the CPU.

BRIEF DESCRIPTION OF THE DRAWINGS

The present invention will be apparent from the following detailed description taken in conjunction with the accompanying drawings, in which.

DETAILED DESCRIPTION OF THE PREFERRED EMBODIMENT

Figure 1:
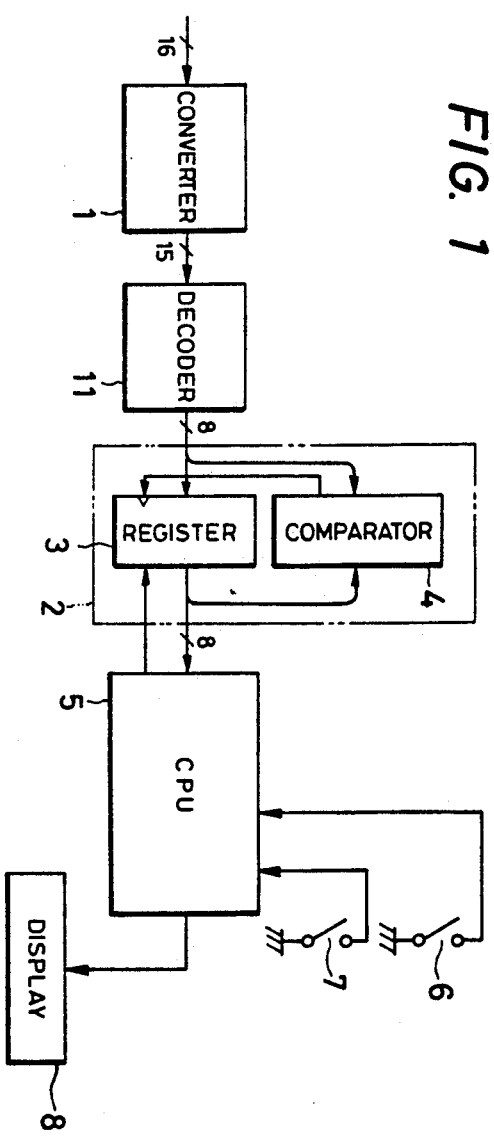
FIG. 1 is a block diagram showing an embodiment of the digital level display device according to the present invention.
Figure 2:
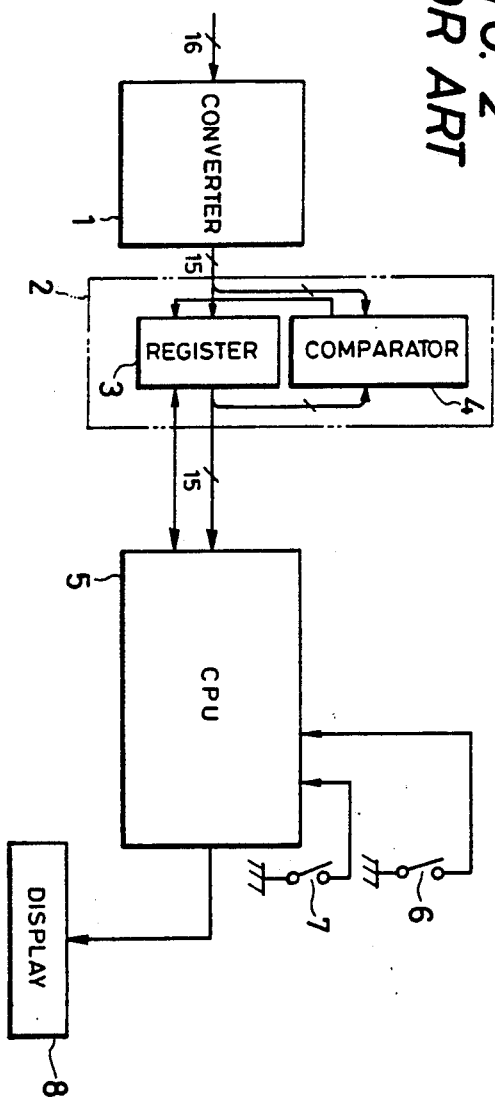
FIG. 2 a block diagram showing an example of the conventional digital level display device.

FIG. 1 is a block diagram showing an embodiment of the digital level display device according to the present invention. In FIG. 1, items corresponding to those in FIG. 2 are correspondingly referenced. In the digital level display device according to the present invention, an absolute value signal produced from a conversion circuit 1 is applied to a decoder 11 provided independently of a CPU 5. The decoder 11 provides an output which is approximately the logarithm of its inputs. An example of a logarithmic decoder is disclosed in Japanese Patent Application 195,059/86 corresponding to U.S. patent application, Ser. No. 07/87,112 filed Aug. 12, 1987 and issued Aug. 8, 1989 as U.S. Pat. No. 4,855,741. Change-over of the resolution is performed by the CPU 5. The arrangement of other parts in the apparatus of FIG. 1 is the same as that in the apparatus of FIG. 2.

A digital signal applied to the conversion circuit 1 is converted into an absolute value signal. In the case where the digital signal is represented, for example, by a 2's complement composed of a predetermined number of bits (16 in the illustrated example), the most significant bit (MSB) is coded to be "0" when the data is positive while the MSB is coded to be "1" when the data is negative. Accordingly, in the case where data is composed, for example, of 16 bits and when the MSB thereof is "0", that is, the data is positive, a signal composed of the remaining or low order 15 bits is made to be an absolute value signal as it is. When the MSB of the data is "1", that is, the data is negative, for example, an exclusive OR of the MSB and each of the bits is operated, that is, each of the bits is inverted and "1" is added to the thus obtained value to thereby obtain an absolute value signal composed of 15 bits. Thus, the negative data is converted into the same signal (the same absolute value signal) as a signal into which positive data having a level equal to that of the negative data is converted.

This absolute value signal is applied to the decoder 11 so that an instantaneous level of the absolute value signal is logarithmically converted for display of the level in dB.

When one piece of data is composed of 16 bits, a dynamic range of the data is about 90 dB. The resolution of the decoder 11 is set corresponding to the minimum value of the resolution to be displayed. That is, in the case where the level is to be displayed, for example, with the resolution of the minimum value of 1 dB, it is sufficient that the output of the decoder 11 can express a value of about 90, and therefore the output can be composed of 7 bits. Even if one bit (an overflow bit) indicating the state of full-scale is added to those 7 bits, the output can be composed of 8 bits in all. The 8-bit output of the decoder 11 is applied to the peak latch circuit 2 constituted, for example, by a register 3 and a comparator 4 so as to detect and latch a peak value of the logarithmic output of the decoder 11. That is, a value stored in the register 3 and a value newly applied from the decoder 11 are compared with each other in the comparator 4. When the newly applied value is larger than the stored one, the newly applied value is stored in the register 3. The value latched in the register 3 is periodically read (at a period sufficiently longer than a sampling period of data) by the CPU 5 at a predetermined timing. It is a matter of course that this value is composed of 8 bits. The value read by the CPU 5 is operated upon and processed on the basis of a routine of a predetermined resolution in a predetermined program of the CPU 5 so as to be converted into an output display signal which is suitable to be displayed on the display 8. Thus, a peak level is displayed on the display means 8.

By means of the CPU 5, the latched value is cleared when the latched data has been read out of the register 3. As a result, a succeeding peak value is latched and then displayed in the same manner as in the foregoing case.

When a selector 7 is operated, a control signal is applied to the CPU 5 and a routine having a resolution different from that in the foregoing case is selected. As a result, the resolution of display on the display 8 can be changed over from one to the other between the resolutions of 1 dB and 3 dB.

As described above, according to the present invention, the digital level display device is arranged to be provided with a conversion circuit 1 for converting an input digital signal into an absolute value signal representing an absolute value of the digital signal. A decoder 11 logarithmically converts the absolute value signal into an output signal of fewer bits than that of the absolute value signal. A peak latch circuit 2 detects and latches a peak of the output signal of the decoder. A CPU 5 reads a signal of the peak latched by the peak latch circuit 2 at a predetermined timing and converts the read signal of the latched peak into a display signal. A display 8 responsive to the display signal from the CPU 5 displays a level of the digital signal. Thereby a load of the CPU 5 can be made reduced, the number of data transfer lines to the CPU 5 can be reduced, and the transfer time can be shortened. Further, the arrangement of the peak latch circuit can be simplified.

We claim:

1. A digital level display device comprising:
    a conversion circuit for conveying an input digital signal into an absolute value signal representing an absolute value of said digital signal;
    a decoder for logarithmically converting said absolute value signal into an output signal of fewer bits than those of said absolute value signal;
    a peak latch circuit for detecting and latching a peak of said output signal of said decoder, said peak latch circuit comprising a comparator and a register, wherein said output signal is input to said comparator, and a currently stored signal in said register also is input to said comparator, said comparator latching the peak if said output signal has a greater value than that of said currently stored signal;
    a CPU for reading a signal of the peak latched by said peak latch circuit at a predetermined timing and for converting said read signal of the latched peak into a displaying signal; and
    display means responsive to the displaying signal from said CPU for displaying a level of said digital signal.

2. A digital level display device as recited in claim 1, wherein said decoder provides an overflow signal.

3. A digital level display device as recited in claim 1, wherein said CPU converts said read signal into said displaying signal according to a selectable resolution.

4. A method of displaying a digital level, comprising the steps of:
    converting an input digital signal into an absolute value signal;
    logarithmically converting said absolute value signal into a logarithmic signal;
    providing a peak latch circuit comprising a comparator and a register;
    detecting and latching a peak of said logarithmic signal in said register of said peak latch circuit by inputting said logarithmic signal and contents of said register into said comparator; and
    displaying a value of said peak.

5. A method of displaying a digital signal, as recited in claim 4 further comprising selecting a variable resolution of said displayed value.

* * * * *